United States Patent [19]

Kappele

[11] Patent Number: 5,069,718

[45] Date of Patent: Dec. 3, 1991

[54] POTASSIUM SUBSTITUTED INKS FOR INK-JET PRINTERS

[75] Inventor: William D. Kappele, San Marcos, Calif.

[73] Assignee: Hewlett-Packard Company, Palo Alto, Calif.

[21] Appl. No.: 609,042

[22] Filed: Nov. 5, 1990

Related U.S. Application Data

[63] Continuation of Ser. No. 350,078, May 10, 1989, abandoned.

[51] Int. Cl.$^5$ .............................................. C09D 11/02
[52] U.S. Cl. .......................................... 106/22; 106/20
[58] Field of Search ........................... 106/20, 22, 410

[56] References Cited

U.S. PATENT DOCUMENTS

| 3,945,836 | 3/1976 | Miyata et al. | 106/22 |
| 3,945,837 | 3/1976 | Miyata et al. | 106/22 |
| 4,685,968 | 8/1987 | Palmer | 106/22 |
| 4,761,180 | 8/1988 | Askeland | 106/22 |
| 4,786,327 | 11/1988 | Wenzel et al. | 106/22 |
| 4,790,880 | 12/1988 | Miller | 106/20 |
| 4,793,860 | 12/1988 | Murakami et al. | 106/22 |
| 4,810,292 | 3/1989 | Palmer et al. | 106/23 |

Primary Examiner—William R. Dixon, Jr.
Assistant Examiner—Helene Klemanski

[57] ABSTRACT

The properties of inks employing copper phthalocyanine dyes having associated therewith sodium cations are improved by replacing the sodium cations with potassium cations. This ion exchange is preferably performed by passing a potassium-containing base through a strong acid resin to replace the H$^+$ ions with K$^+$ ions. The dye is then passed through the potassium-loaded resin to effect the ion exchange. Inks made from the potassium-substituted dyes evidence reduced crusting, increased idle time without causing drop ejection failures (soft plugs) and improved kogation without suffering any loss in print quality.

21 Claims, No Drawings

POTASSIUM SUBSTITUTED INKS FOR INK-JET PRINTERS

This is a continuation of copending application(s) Ser. No. 07/350,078 filed on May 10, 1989, now abandoned.

TECHNICAL FIELD

The present invention is directed to preparation of inks employed in ink-jet printing, and, more particularly, to an improved process for preparing ink compositions used in thermal ink-jet printing.

BACKGROUND ART

In a modern thermal ink-jet printhead device, resistors used to propel bubbles of ink toward the paper substrate must be able to fire for millions of times without failure. In thermal printhead printing, the purity and chemical structure of the dye in the ink can radically affect the printhead operation, resulting in resistor failure or nozzle clogging.

Changing the cation of the dye molecule improves the solubility of the dye molecule in the solvent, which prevents crusting (clogging of the printhead nozzle from dye precipitation during storage). Selection of the proper cation can also significantly improve resistor life of the printhead. Substitution of FD&C Blue Dye #1 improves resistor life from about 13 million firings to about 25 million firings by changing the cation associated with the dye from sodium to triethanol amine.

Other cations have also been substituted for sodium in an attempt to reduce crusting; examples include lithium and tetramethyl ammonium cations. In the case of thermal ink-jet printers, such substituted cations must not result in an ink that evidences a worsened kogation.

It is known that sodium-containing dyes suffer from crusting. Yet, these dyes often have better kogation properties than many of the cation-substituted dyes. Kogation is a coined term, unique to thermal ink-jet printing, which describes the extent of decomposition of the ink on the resistors of thermal ink-jet printers as a consequence of resistive heating.

Often, a balance between the desirable low crusting properties of the cation-substituted dye and the desirable low kogation properties of the sodium-containing dye may be achieved by blending the cation-exchanged dye with sodium-containing dye, the latter possibly purified by the reverse osmosis process described above to remove excess sodium.

In formulating such a blend, many factors will ordinarily be considered, such as the construction of the ink pen, that is, the resistor design, how hot the resistors are fired, the character of the surface (the extent of carbon sticking from the decomposition of the ink, or kogation), the thickness of layers for heat transfer, and so forth.

Copper phthalocyanine dyes find extensive use in thermal ink-jet printing. However, the sodium-containing dyes (which are commercially available) tend to form plugs (both hard and soft) in the orifices of the printheads when the printer is idle. Such plugs may be difficult to completely blow away before the printhead can be used again. This operation of blowing away is called repriming, and must be done prior to use of the pen. Algorithms in the printer are used to control the number of times of repriming. Of course, ink is lost in repriming, and thus dyes with reduced plug-forming ability would reduce the frequency of repriming. Finally, some cationic forms yield plugs which cannot be removed simply by priming and thus render the pen unusable; examples of such cationic forms include potassium-Food Black 2 and sodium-Acid Red 87.

DISCLOSURE OF INVENTION

In accordance with the invention, copper phthalocyanine dyes containing sodium cations are treated to replace the sodium cations with potassium cations. Such replacement must be at least about 75% in order to realize the benefits of the invention.

The replacement is advantageously done by passing the sodium-containing copper phthalocyanine dye through an ion exchange resin loaded with potassium cations. However, other ion exchange methods may alternatively be used.

The cation-exchanged dye solution is then blended with one or more glycols or other components to formulate the desired ink composition. Inks prepared from the potassium-containing dyes of the invention evidence improved start-up performance, as seen by reduced plug-forming and easier clearing of plugs. Further, no kogation is observed with the dyes of the invention.

BEST MODES FOR CARRYING OUT THE INVENTION

Copper phthalocyanine dyes comprise a group of colored compounds related to the porphorins, containing four isoindole rings linked in a 16-membered ring of alternate C and N atoms, around a central atom, here, copper. An anionic group is typically attached to at least one of the four phenyl rings of the isoindole rings to yield different dyes. The anionic group is typically sulfonate. For Direct Blue 199, for example, two sulfonate groups are present, one each on opposite phenyl rings in one of the two open positions. Cations, usually sodium, provide charge balance.

Commercially prepared copper phthalocyanine dyes are presently available complexed with sodium cations. Thus, it will be appreciated that the discussion which follows is given in terms of partially (at least about 75%) or totally replacing sodium cations with potassium cations; the resulting modified dye evidences improved properties over the sodium form.

Examples of copper phthalocyanine dyes benefited by the teachings of the invention include, but are not limited to, Direct Blue 199, Reactive Blue 71, Reactive Blue 77, Reactive Blue 21, and Direct Blue 86.

In the practice of the process of the invention, it is preferred that the dye first be purified. While not essential to the practice of the invention, the purification step improves the efficiency of the ion exchange process.

Dye purification is best accomplished by reverse osmosis. However, other purification methods are well-known, and the practice of the invention is not limited to the use of reverse osmosis.

In the reverse osmosis process, chloride, excess sodium, and impurities, which are present in the dye as received from the manufacturer, are removed from the dye. Of course, if the manufacturer has previously removed these impurities, this step may be eliminated.

In the purification of the dye, the dye is first dissolved in water in an amount ranging from about 6 to 15 wt %, or up to the solubility limit of the dye, to form a dye solution. The lower concentration is constrained by economic considerations, with the overall process consuming too long a period of time at concentrations much below about 6 wt %. The upper concentration is constrained by the presence of too much dye clogging the membrane in reverse osmosis purification.

The reverse osmosis process used to purify the dye solution may employ spiral wound, plate and frame or open tubular type systems or variations thereof. For a spiral wound system, for example, the pressure may range from about 100 to 300 psi and the flow (which is a function of the membrane employed) is typically maintained in the range of about 1 to 3 gal/min per pressure vessel of 100 to 200 ft$^2$ of membrane area.

While the reverse osmosis process is ordinarily operated at room temperature, it may be operated at an elevated temperature, limited only by the composition of the membrane or the boiling point of the solution. In practice, the temperature may range from about 0° 100° C. It is possible to utilize several pressure vessels in parallel, which provides a corresponding increase in surface area. Further, series configurations may be employed; such configurations are also well-known.

As is well-known, the feed stock in the pressure vessel is separated by the membrane into a concentrate (which contains the dye) and the permeate (which contains impurities and a small amount of the dye).

The reverse osmosis process is used to remove chloride ions, excess sodium ions and other impurities and to provide a dye that has an inorganic purity of about 99.9%. The conductivity of the concentrate is monitored, conveniently using a chloride electrode, until a substantially constant reading is achieved and equilibrium is reached, which indicates that no more purification is taking place. The purified dye still has sodium cations associated with the sulfonate groups on the dye.

In accordance with the invention, the sodium ions are replaced with the desired cation species by ion exchange, involving passing an aqueous solution of the dye through a strong acid ion exchange resin which has priorly been treated with an excess of potassium hydroxide or other potassium base. The sodium cations from the dye molecule are retained on the ion exchange resin, and the solution passing through the resin becomes the potassium form of the dye. Suitable ion exchange resins are so-called strong acid ion exchange resins, such as Dowex 50X-8, available from Dow Chemical Company (Midland, Mich.), Duolite Cation Resin 225X 10H, available from Rohm & Haas (Philadelphia, Pa.), and Amberlite CG 120, also available from Rohm & Haas. Many other strong acid ion exchange resins are also commercially available.

In order to obtain the substantially completely substituted potassium form of the dye, the amount of resin to be used must be determined. This is conveniently done by determining the milliequivalents of H$^+$ per milliliter of wet resin. Knowing the concentration of the dye and the number of sulfonate groups on the dye (for example, for Direct Blue 199 there are two such groups), one can easily determine the theoretical amount of resin required from literature values.

The number of milliequivalents of H$^+$ per liter is also used to determine the amount of potassium hydroxide (or other potassium base) to load on the resin. In order to ensure that substantially all of the sodium cations are replaced by potassium cations, all of the hydrogen cations on the resin must be replaced by potassium cations. This is best done by passing an excess of potassium hydroxide through the resin bed; advantageously, an excess of 50% over that calculated will result in total replacement of hydrogen cations by potassium cations, although more or less may be used, as required, depending on the size and dimensions of the column.

The total replacement of hydrogen cations by potassium cations on the resin ensures that the H$^+$ form of the dye is not generated; the acid form of copper phthalocyanine dyes is a gel, which tends to clog the resin column, thereby inhibiting the facile conversion of the sodium form of the dye to the potassium form. The direct substitution of potassium for sodium therefore must be done in L an alkaline or neutral environment (e.g., pH $\approx$ 7-8).

Following the procedure given above, the dye solution has the desired strength to use in formulating the ink. If more dye solution is recovered by passing more solvent through the column, then the dye solution recovered would be too dilute to use directly to formulate the ink. In such a case, the dye solution from the ion exchange process may be concentrated, such as by reverse osmosis or rotary evaporation or other suitable method, to obtain a concentrated dye solution that is used in preparing the final ink formulation.

The vehicle and the dye solution are combined to form the ink. The vehicle may comprise any of, or a mixture of two or more of, the following components: glycols such as diethylene glycol, triethylene glycol, tetraethylene glycol, propylene glycol, dipropylene glycol, tripropylene glycol, 1,3-butanediol, 1,4-butanediol, 1,5-pentanediol, 1,6-hexanediol, 2,5-hexanediol, hexylene glycol, glycerol, half ethers and ethers of propylene glycols such as propylene glycol monomethyl ether, propylene glycol isopropyl ether, propylene glycol n-butyl ether, propylene glycol ethyl ether, dipropylene glycol monomethyl ether, dipropylene glycol ethyl ether, dipropylene glycol n-butyl ether, dipropylene glycol iso-propyl ether, tripropylene glycol monomethyl ether, tripropylene glycol ethyl ether, tripropylene glycol n-butyl ether, tripropylene glycol, ethers of glyceryl such as glyceryl $\alpha$-monomethyl ether, glyceryl $\alpha$, -dimethyl ether, glyceryl $\alpha$-mono-n-butyl ether, alcohols such as sec-butyl alcohol, tert-amyl alcohol, cyclohexyl alcohol, sec-octyl alcohol, diacetone alcohol, benzyl alcohol, iso-propanol, n-propanol, methanol, ethanol, esters such as butyl lactate, ethyl lactate, n-butyl propionate, polymeric glycols such as PEG 200, PEG 300, PEG 400, PPG 400, and water.

Further, the vehicle may include any of the additives used in ink-jet compositions, such as surfactants to improve the wettability of the ink on paper, polymers to help control bubble formation of inks in thermal ink-jet printers, fungicides, and bactericides. The purity of the components used in preparing the inks of the invention is that found in normal commercial practice.

The concentration of the copper phthalocyanine dye in the ink typically ranges from about 1 to 5 wt %, and preferably about 1 to 3 wt %. The composition of the vehicle preferably comprises 40 to 96 wt % water and the balance one or more members selected from the group consisting of glycols, glycerol, half ethers and ethers of propylene glycols, ethers of glyceryl, alcohols, esters, and polymeric glycols, as indicated above.

The ion-exchange resin may be regenerated for treating another dye solution. The regeneration is conveniently done by passing potassium chloride through the column and then washing with water until the pH of the rinse is approximately neutral. This process leaves behind only K$^+$ on the resin.

It is well-known that sodium cations associated with copper phthalocyanine dyes such as Direct Blue 199 cause crusting. The process of the invention provides a potassium-substituted copper phthalocyanine dye, which has been found to reduce crusting of the ink.

Yet, sodium-containing dyes often have better kogation properties than many of the cation-substituted dyes. Often, a balance between the desirable low crusting properties of the cation-substituted dye and the desirable low kogation properties of the sodium-containing dye must be done, such as by blending the cation-exchanged dye with sodium-containing dye, the latter possibly purified by the reverse osmosis process described above to remove excess sodium. The potassium-substituted dyes of the invention have kogation properties that are equivalent to those of the sodium-containing dyes and superior to dyes in which sodium cations are replaced with other cations, for example, tetramethyl ammonium cations.

Ion exchange by means of a resin is a very fast and efficient process for replacement of one cation species with another. However, other ion exchange methods, such as reverse osmosis, may also be used in the practice of the invention.

INDUSTRIAL APPLICABILITY

The potassium-substituted copper phthalocyanine dyes of the invention are expected to be used in ink-jet printing, and particularly in thermal ink-jet printing.

EXAMPLES

Example 1. Substitution of K on Direct Blue 199 Dye Via Ion Exchange

A column containing about 250 ml of Dowex 50W-X4 resin bed was initially generated with potassium hydroxide, and subsequently regenerated with 500 ml of 1M KCl (aq). The column was then washed with 1 l deionized (DI) water.

A 300 ml sample of Direct Blue 199 dye, received in purified form from Imperial Chemical Industries (Manchester, England), was passed through the column, followed by DI water until 300 ml of colored solution was collected. With good column performance, less than 1 l of water should be required to rinse the column clean.

The ratio of dye to resin was chosen so that the sodium cations on the dye were completely replaced with potassium cations. The concentration of sodium in the dye following the ion exchange was 6 ppm.

The number of moles of sodium per mole of dye prior to the ion exchange treatment was determined to be 2. Following ion exchange, the number of moles of sodium per mole of dye was determined to be 0.002, while the number of moles of potassium per mole of dye was determined to be 2.

The substituted dye was then mixed with water, diethylene glycol, and 0.3 wt % Nuosept 95 bactericide to obtain the final ink composition desired. The ink comprised 3 wt % of the dye in a vehicle comprising 5.5/94.5 (by volume) of DEG and water.

The soft plug performance of this ink was improved by 60% at ambient, compared to an ink employing the sodium form of the dye. No visible crusting was observed, and kogation performance was equivalent to an ink employing the sodium form of the dye.

Example 2. Substitution of Potassium on Reactive Blue 71 Dye Via Ion Exchange The column was prepared as in Example 1. A 300 ml sample of 6 wt % Direct Blue 199 dye, purified by reverse osmosis, was passed through the column, followed by DI water until 300 ml of colored solution was collected. With good column performance, less than 1 l of water should be required to rinse the column clean.

The ratio of dye to resin was chosen so that the sodium cations on the dye were completely replaced with potassium cations. The concentration of sodium in the dye following the ion exchange was 6 ppm.

The number of moles of sodium per mole of dye prior to the ion exchange treatment was determined to be 2. Following ion exchange, the number of moles of sodium per mole of dye was determined to be 0.002, while the number of moles of potassium per mole of dye was determined to be 2.

The substituted dye was then mixed with water, diethylene glycol, and 0.3 wt % Nuosept 95 bactericide to obtain the final ink composition desired. The ink comprised 3 wt % of the dye in a vehicle comprising 5.5/94.5 (by volume) of DEG and water.

The soft plug performance of this ink was improved by 60% at ambient, compared to an ink employing the sodium form of the dye. No visible crusting was observed, and kogation performance was equivalent to an ink employing the sodium form of the dye.

Ink samples from the dyes treated in Examples 1 and 2 were used to fill three pens from each for testing. The pens showed little or no crusting and normal kogation compared to an ink prepared from sodium-containing dye not treated in accordance with the invention.

Thus, there has been disclosed a process for reducing the crusting properties of sodium-containing copper phthalocyanine dyes used in ink-jet printing. The process includes ion exchange and replaces substantially all of the sodium cations with potassium cations. Many changes and modifications will be readily apparent to those of ordinary skill in the art, and all such changes and modifications are deemed to be within the scope of this invention, as defined by the scope of the appended claims.

What is claimed is:

1. A process for preparing an ink composition comprising a vehicle and a copper phthalocyanine dye having associated therewith at least one negatively charged functional group with which a first cation species is associated, said ink composition suitable for use in ink-jet printing, said process comprising:

(a) replacing said first cation species on said dye with potassium cations to form an ion-exchanged dye; and (b) admixing said ion-exchanged dye with said vehicle to form said ink.

2. The process of claim 1 wherein said dye containing said first cation species is purified prior to said cation-replacing.

3. The process of claim 2 wherein said dye is purified by reverse osmosis.

4. The process of claim 1 wherein said first cation species consists essentially of sodium.

5. The process of claim 4 wherein at least about 75% of said sodium ions are replaced with potassium ions.

6. The process of claim 5 wherein substantially all of said sodium ions are replaced with potassium ions.

7. The process of claim 1 wherein said copper phthalocyanine dye is selected from the group consisting of Direct Blue 199, Reactive Blue 71, Reactive Blue 77, Reactive Blue 21, Direct Blue 86.

8. The process of claim 1 wherein said first cation species on said dye are replaced with said potassium cations by passing an aqueous solution of said dye through an ion exchange resin loaded with said potassium cations.

9. The process of claim 8 wherein hydrogen ions on a strong acid ion exchange resin are substantially replaced with potassium ions by passing therethrough a solution containing a potassium species.

10. The process of claim 1 wherein said vehicle comprises at least one component selected from the group consisting of glycols, glycerol, half ethers and ethers of propylene glycols, ethers of glyceryl, alcohols, esters, polymeric glycols, and water.

11. The process of claim 10 wherein said at least one component comprises a member selected from the group consisting of diethylene glycol, triethylene glycol, tetraethylene glycol, propylene glycol, dipropylene glycol, tripropylene glycol, 1,3-butanediol, 1,4-butanediol, 1,5-pentanediol, 1,6-hexanediol, 2,5-hexane diol, hexylene glycol, propylene glycol monomethyl ether, propylene glycol isopropyl ether, propylene glycol n-butyl ether, propylene glycol ethyl ether, dipropylene glycol monomethyl ether, dipropylene glycol ethyl ether, dipropylene glycol n-butyl ether, dipropylene glycol iso-propyl ether, tripropylene glycol monomethyl ether, tripropylene glycol ethyl ether, tripropylene glycol D-butyl ether, tripropylene glycol, glyceryl α-monomethyl ether, glyceryl α, -dimethyl ether, glyceryl α-mono-n-butyl ether, sec-butyl alcohol, tert-amyl alcohol, cyclohexyl alcohol, secoctyl alcohol, diacetone alcohol, benzyl alcohol, iso-propanol, n-propanol, methanol, ethanol, butyl lactate, ethyl lactate, n-butyl propionate, Polyethylene glycol 200, Polyethylene glycol 300, Polyethylene glycol 400, Polypropylene glycol 400, and water.

12. The process of claim 10 wherein said vehicle comprises about 40 to 96% water.

13. The process of claim 1 wherein said ink composition comprises about 1 to 5 wt % of said copper phthalocyanine dye.

14. A copper phthalocyanine dye having anionic sites with which cations are associated, wherein said cations are potassium.

15. An ink composition suitable for use in ink-jet printers comprising:
  (a) a vehicle comprising about 40 to 96% water and the balance at least one member selected from the group consisting of glycols, glycerol, half ethers and ethers of propylene glycols, ethers of glyceryl, alcohols, esters, and polymeric glycols; and
  (b) a copper phthalocyanine dye having at least one negatively charged functional group per molecule, present in an amount from about 1 to 5% of the vehicle composition, said functional group associated with cations, wherein at least about 75% of said cations are potassium.

16. The ink composition of claim 15 wherein substantially all of said cations are potassium.

17. The ink composition of claim 15 wherein said copper phthalocyanine dye is selected from the group consisting of Direct Blue 199, Reactive Blue 71, Reactive Blue 77, Reactive Blue 21, Direct Blue 86.

18. The ink composition of claim 15 wherein said at least one member comprises a member selected from the group consisting of diethylene glycol, triethylene glycol, tetraethylene glycol, propylene glycol, dipropylene glycol, tripropylene glycol, 1,3-butanediol, 1,4-butanediol, 1,5-pentanediol, 1,6-hexanediol, 2,5-hexane diol, hexylene glycol, propylene glycol monomethyl ether, propylene glycol isopropyl ether, propylene glycol n-butyl ether, propylene glycol ethyl ether, dipropylene glycol monomethyl ether, dipropylene glycol ethyl ether, dipropylene glycol n-butyl ether, dipropylene glycol iso-propyl ether, tripropylene glycol monomethyl ether, tripropylene glycol ethyl ether, tripropylene glycol n-butyl ether, tripropylene glycol, glyceryl α-monomethyl ether, glyceryl α, -dimethyl ether, glyceryl α-mono-n-butyl ether, sec-butyl alcohol, tert-amyl alcohol, cyclohexyl alcohol, secoctyl alcohol, diacetone alcohol, benzyl alcohol, iso-propanol, n-propanol, methanol, ethanol, butyl lactate, ethyl lactate, n-butyl propionate, Polypropylene glycol, Polypropylene glycol 200, Polypropylene glycol 300, Polypropylene glycol 400, and PPG 400.

19. The process of claim 1 wherein said copper phthalocyanine dye with which said first cation species is associated is passed through an ion exchange column containing a strong acid ion exchange resin which has priorly been treated with an excess of a potassium base.

20. The process of claim 19 wherein said potassium base consists essentially of potassium hydroxide.

21. The process of claim 19 wherein said treated resin has a pH of about 6 to 7.

* * * * *